United States Patent

Hill et al.

[15] 3,637,462

[45] Jan. 25, 1972

[54] PURIFICATION OF ENZYMES

[72] Inventors: Joseph M. Hill, Dallas; Robert J. Speer, Richardson, both of Tex.

[73] Assignee: J. K. and Susie L. Wadley Research Institute and Blood Bank, Dallas, Tex.

[22] Filed: Apr. 21, 1969

[21] Appl. No.: 818,117

[52] U.S. Cl. .............................. 195/66 A, 195/66 R, 424/94
[51] Int. Cl. .......................................................... C07g 7/028
[58] Field of Search ................................................ 195/66 A

[56] References Cited

UNITED STATES PATENTS

| | | | |
|---|---|---|---|
| 3,234,106 | 2/1966 | Hink et al. | 196/66 X |
| 3,434,929 | 3/1969 | Buck et al. | 195/66 |
| 3,502,545 | 3/1970 | Westman et al. | 195/66 |

OTHER PUBLICATIONS

Rowley et al., Biochemical and Biophysical Research Communications, Vol. 28, No. 2, 1967

*Primary Examiner*—Lionel M. Shapiro
*Attorney*—Richards, Harris & Hubbard

[57] ABSTRACT

A therapeutic enzyme such as L-Asparaginase is purified from a protein mixture containing the L-Asparaginase by adding a controlled amount of a buffer solution which will solubilize a major portion of the protein mixture, but only a minor portion of the L-Asparaginase, for example, a sodium acetate buffer solution having a pH in the range of 5.3 to 5.7, and thoroughly mixing the resulting dispersion until the protein is solubilized and a solution is formed containing the enzyme dispersed therein. The enzyme is then separated from the buffer solution by suitable means such as centrifugation. Noxious agents such as endotoxin and pyrogen are removed from the purified or partially purified L-Asparaginase by intimate contact with a water insoluble nonionic sorbent material. Additionally, protectant agents such as Vitamin C can be added to the purified or partially purified L-Asparaginase and thereby cause an increase in the storage life thereof.

17 Claims, No Drawings

PURIFICATION OF ENZYMES

This invention relates to chemical purification processes. Another aspect, this invention relates to the purification of therapeutic enzymes such as L-Asparaginase.

In 1953, it was observed that guinea pig serum caused regression of some types of tumors in mice and rats. Eight years later the antitumor agent in the guinea pig serum was identified as L-Asparaginase. L-Asparaginase as used herein is intended to identify the enzyme L-Asparagine amidohydrolase having the Enzyme Commission Number 3.5.1.1.

Analysis revealed that the normal guinea pig yielded only about 30 International Units of L-Asparaginase which rendered the cost of the drug prohibitive for administration to humans. One International Unit (I.U.) of L-Asparaginase is that amount which will liberate one micromole of $NH_3$ from L-Asparagine per minute at 37° C. and pH 8. Specifically, human dosage may require 1,000,000 I.U. or more per day per person. Production of such dosages would necessitate that serum be extracted from 30,000 guinea pigs per day per person being treated with the serum. With the cost of guinea pigs being about $2 per guinea pig, the cost of one days dosage for one individual would amount to about $60,000 for the guinea pigs in addition to which must be added the cost of processing the large quantity of serum.

In 1964, it was learned that L-Asparaginase isolated from *Escherichia coli* (*E. coli*) also exhibited antitumor properties. Several methods were suggested for producing L-Asparaginase from *E. coli*. The *E. coli* was normally cultivated in a nutrient medium such as trypticase soy agar, peptone or Kornberg solutions. The *E. coli* after being cultivated for a period of 15 to 20 hours was harvested and the enzymes contained within the bacterial cells following rupture of the cells by sonication were purified by various procedures such as those suggested by Mashburn and Wriston (1966) *Nature* 211, 1403 and Mashburn and Wriston (1964) *Arch. Biochem. Biophys.* 105,451.

More particularly, a typical purification procedure involved the treatment of the ruptured cell suspension with 0.05 volume of 1 M $MnCl_2$ to precipitate the ruptured cell walls and nucleic acids. The precipitate is then separated from the supernatant by centrifugation. Some of the impurities in the supernatant are then precipitated by bringing the solution to 2 M by addition of $(NH_4)_2SO_4$ and adjusting the pH of the solution to 8.0 with $NH_4OH$. The precipitate is removed by centrifugation and the supernatant is brought to 4 M by the addition of $(NH_4)_2SO_4$ and the pH adjusted to 8.0 by addition of $NH_4OH$ resulting in a precipitate containing L-Asparaginase which is removed by centrifugation and redissolved by dialysis against 0.05 M sodium phosphate buffer having a pH of 8.6. The dialyzed enzyme solution is purified further by column chromatography. More particularly, the L-Asparaginase is eluted from a hydroxylapatite column which has been equilibrated with 0.05M tris-HC1 having a pH of 8.6. The elution may be effected with 0.10M sodium phosphate or 0.10M potassium phosphate. The effluent containing the L-Asparaginase can be further purified by elution from a diethylaminoethyl cellulose column (DEAE-cellulose) with sodium chloride solution, the concentration of which is varied over a range between 0.06M and 0.2M.

In short, the microbial organism is, after growth in a nutrient medium, treated to rupture the bacterial cell walls releasing the enzymes contained within the bacterial cells. The solution containing the L-Asparaginase is then treated with ammonium sulfate to precipitate L-Asparaginase and other proteins which are subsequently redissolved by a dialysis against a buffer solution. The dialyzed enzyme solution is then chromatographically purified to separate the L-Asparaginase from other proteins.

Another recently developed purification technique includes the purification of L-Asparaginase from a mixture containing a ruptured microbial organism by the use of alcohol precipitation techniques followed by both cationic and anionic chromatographic separation.

The best of these prior art techniques employed to produce L-asparaginase from microbial organisms will yield a specific activity (purity) of the L-Asparaginase of no more than about 250 International Units (I.U.) per milligram protein. This is a purity of no greater than about 50 percent.

FUrthermore, the prior art techniques result in L-Asparaginase which contains excessive unwanted impurities including endotoxin and pyrogen.

Therefore, one object of this invention is to provide a novel method of purifying therapeutic enzymes such as L-Asparaginase.

Another object of this invention is to provide a novel method of removing noxious agents such as endotoxin and pyrogen from therapeutic materials.

A further object of this invention is to provide a novel method of purifying L-Asparaginase from a mixture containing ruptured microbial organisms which results in yields of L-Asparaginase of greater quantity and purity than heretofore known in the art.

Still a further object of this invention is to provide a method of stabilizing purified L-Asparaginase to thereby retard normal degration processes which occur in storage.

According to one embodiment of this invention, a therapeutic enzyme is purified by adding a controlled amount of a buffer solution to the mixture, said buffer being a better solvent for the protein than for the enzyme, and thoroughly admixing the resulting dispersion to solubilize the protein and form a solution containing the enzyme suspended therein. The enzyme is then removed from the solution by a suitable method, such as centrifugation. The preferred operation includes the purification of L-Asparaginase from a protein mixture with a buffer solution having a pH in the range of 5.3 to 5.7.

According to another embodiment of this invention, noxious agents such as metabolites/catabolites and bacterial components are removed from therapeutic materials such as L-Asparaginase by intimately contacting the therapeutic material with a water insoluble nonionic sorbent material. It has been found that these sorbents will selectively remove the above described noxious agents from the therapeutic agent.

According to a further embodiment of this invention, an enzyme such as L-Asparaginase is purified by the first above described embodiment, and treated according to the second above described embodiment, and thereafter passed through a chromatographic column containing a cation exchange resin to yield a highly purified enzyme.

According to still another embodiment of this invention, a stabilization agent such as, for example, dextrose or Vitamin C is added to the enzyme entering the chromatographic column in the above described embodiment, or to the enzyme eluted from the above described chromatographic column to yield a highly stable purified enzyme product.

The preferred embodiments of this invention will be described in detail below in relation to the purification of L-Asparaginase from a ruptured microbial organism. However, it is to be noted that various embodiments of this invention can be utilized to purify other therapeutic enyzmes such as for example, glutaminase. The L-Asparaginase which can be purified according to the embodiments of this invention can be produced by any means known in the art. A particularly effective method of producing L-Asparaginase from a microbial organism, such as *Escherichia coli*, encompasses the use of a nutrient medium for growth of the microbial organism which contains a substantial amount of free L-threonine or lactic acid and free amino acids, as disclosed in copending application Ser. No. 735,196, filed June 7, 1968.

The microbial organisms are then ruptured by various techniques known in the art such as sonication, the use of a hydraulic or fly press, ultrasonic waves, homogenizers, pressure release devices employing compressed gases, and mechanical grinders and shakers, for example.

After the cell walls of the microbial organisms are ruptured, the L-Asparaginase is separated therefrom by a preliminary rough purification procedure. This preliminary rough purification procedure can include any of the above described prior art procedures such as for example, precipitation by magnesium chloride, acidification, hot or cold alcohol in any combination or sequence. It is generally preferred that the L-Asparaginase be removed from the mixture containing the ruptured microbial organism by precipitation techniques using a water miscible organic solvent. Suitable water miscible organic solvents include the following which may be applied in absolute form or diluted with water in various proportions: methanol, ethanol, propanol, isopropanol, dioxane, tetrahydrofuran, acetone and mixtures thereof. This list is not intended to be inclusive of all water miscible organic solvents which can be used, for example, diethyl ether can be used at very low temperatures. The preliminary rough purification procedure generally includes adding sufficient quantity of the water miscible organic solvent to precipitate the cell walls and other undesirable constituents of the organism present in the mixture without precipitating the L-Asparaginase. The precipitated cell walls and other undesirable constituents are separated from the resulting supernatant by suitable methods such as centrifugation. Next, a sufficient quantity of the water miscible organic solvent is added to the resulting supernatant to precipitate the L-Asparaginase along with various other proteins in a mixture.

Next, the protein mixture containing the L-Asparaginase (which can be either in a dried form or in a form containing up to about 40 percent of the water miscible solvent) is subjected to the buffer-extraction step of this invention. It is generally preferred that the L-Asparaginase contain about 10 percent of the water miscible solvent, e.g., ethanol or isopropanol, etc., for treatment with the buffer solution; however, the process of this invention can be conducted when the protein mixture contains none of the water miscible solvent. It has been found that the protein mixture can be removed from the L-Asparaginase by mixing with a controlled volume of a buffer solution which solubilizes the protein, but is relatively a nonsolvent for the L-Asparaginase. It is herein understood that the phrase "relatively a nonsolvent for L-Asparaginase" means any buffer which more readily solubilizes the protein in the L-Asparaginase containing precipitate than the L-Asparaginase. The buffer solution generally must be at a pH in the range of 5.3 to 5.7, preferably about 5.5.

Suitable buffer solutions include the aqueous solutions of the sodium, lithium, potassium, and ammonium salts of organic acids such as acetic, citric, maleic, succinic, amino acids such as glycine and inorganic acids such as boric. Particularly preferred are the sodium salts, for example, sodium acetate, sodium citrate, sodium maleate, sodium succinate, sodium glycinate and sodium borate. The most preferred aqueous buffer solutions contain from 0.01 M to 0.1 M sodium acetate.

Sufficient buffer solution is added to the L-Asparaginase-protein precipitate to form a mixture containing from 40 to 400 milligrams total protein per milliliter of the buffer solution, preferably from 80 to 120 milligrams of total protein per milliliter of the buffer solution. Thus, from 2.5 to 25 milliliter are added for each gram of total protein in the precipitate. The resulting mixture is thoroughly admixed under conditions to assure the protein will solubilize in the buffer solution and the majority of the L-Asparaginase will remain dispersed therein. This mixing step can be carried out under any suitable temperature and pressure conditions which assure that the mixing will occur in the liquid phase; however, it is generally preferred that the mixing occur at atmospheric pressure and at a temperature in the range of 0° C. to 10° C. The actual mixing can be carried out in conventional equipment, for example, a magnetic stirring bar mechanism operated at about 500 r.p.m. for about 2 hours. After this step, the resulting buffer solution will contain substantially all of the unwanted protein and no more than about 25 weight percent of the L-Asparaginase. About 75 weight percent of the L-Asparaginase will be suspended with the buffer solution. The L-Asparaginase is removed from the resulting buffer solution by any suitable means such as centrifugation, for example, the material can be centrifuged at about 10,000 r.p.m. from 1 to 2 hours. The resulting L-Asparaginase precipitate is generally as pure as final product L-Asparaginase purified by prior art processes. However, the L-Asparaginase is further processed according to the invention as will be described below. The resulting supernatant containing the unwanted protein and a minor portion of the L-Asparaginase can be either discarded or recycled to the mixture entering the preliminary rough purification step.

According to another embodiment of this invention, noxious metabolites/catabolites and bacterial components such as endotoxin and pyrogen are removed from a therapeutic mixture such as the L-Asparaginase-protein mixture or the L-Asparaginase precipitate from the buffer-extraction step described above, by intimately contacting the therapeutic mixture with a water insoluble nonionic (neither acidic nor basic properties) sorbent material. Suitable materials include the water insoluble polysaccharides and polydextrose compounds. A particularly preferred material is a purified cellulose produced by removing lignin and other natural impurities from cellulose. An example of such a material is a product sold under the trademark of Solka Floc BW 200 by Brown Company, 277 Park Avenue, New York, N.Y. Other suitable materials include the nonionic materials sold under the trademark of Dextran by Pharmacia Fine Chemicals, Inc. of Uppsala, Sweden, and the nonionic materials sold under the trademark of Biogel by Bio-Rad Laboratories, Richmond, California. Thus, it has been found that when these water insoluble nonionic sorbents are intimately contacted with therapeutic solutions or mixtures, or solutions or mixtures containing therapeutic materials to be extracted therefrom, noxious catabolites and bacterial components such as pyrogen and endotoxin are adsorbed by the sorbent material and removed therefrom. It is generally desirable that the water insoluble nonionic material be thoroughly admixed in particulate form with the mixture or solution to be purified in a manner so that substantially complete contact of the sorbent with the mixture is attained. The time of contact is not critical and will generally vary with the method of contact. The particulate sorbent carrying the noxious agents can be removed from the solution by centrifugation or filtration, or any other suitable fluid-solids separation means.

In the L-Asparaginase purification process of this invention, the noxious catabolites and bacterial components can be removed with the water insoluble nonionic material at any convenient point. For example, at a point after the bacterial cell walls are ruptured, or after the L-Asparaginase-protein mixture is precipitated from the ruptured cell walls, or after the buffer-extraction embodiment described above. Thus, the sorbent can be utilized in the process at any point after the bacteria are fractured and preferably as long as the protein contains no high ion concentrations such as high concentrations of ammonium sulfate because of their tendency to support desorption. The pH conditions of the contact are generally not critical. This sorbent step has been successfully conducted at pH values from 5 to about 8. It is generally preferred that this step be conducted immediately preceding or in conjunction with the chromatographic process described below. The sorbent material is applied in amounts ranging from 5 to about 25 percent by weight of the material to be treated, for example, from 5 to 25 percent by weight of protein solids in L-Asparaginase purification process. It is generally preferred to utilize the sorbent in an amount in the range of from 10 to 25 weight percent of the protein solids being purified.

The L-Asparaginase precipitate from the buffer extraction step is suspended in a buffer solution having a pH of about 5, preparatory to passage through a chromatographic column containing a cation exchange resin. At this point, the water insoluble nonionic material can be admixed with the L-Asparaginase-containing buffer solution and either separated by centrifugation, or applied directly to the top of the chromatographic column. The chromatographic column will in effect filter the nonionic sorbent as the L-Asparaginase is eluted therethrough. Alternatively, the nonionic sorbent can be intimately mixed, for example, in a 50 weight percent admixture with the cation exchange resin and form part of the chromatographic column. A more preferred arrangement is to place the nonionic sorbent in the upper regions of the chromatographic column. The buffer solution containing the L-Asparaginase is then applied to the nonionic sorbent and thoroughly admixed therein by stirring. This procedure not only will remove the noxious catabolites and bacterial components from the L-Asparaginase, but will also further purify the L-Asparaginase through chromatographic separation.

Any suitable cation exchange resin can be employed in the chromatographic process of this invention, for example, CM–Sephadex, SE–Sephadex, CM–cellulose CM–Biogel, phosphocellulose, Amberlite IRC–50 or TRC–50 (XE–64). The "Sephadex" resins can be obtained from the above described Pharmacia Fine Chemicals, Inc. and the "Biogel" resins from the above described Bio-Rad Laboratories, while the "Amberlite" resins can be obtained from Rohm & Haas, Philadelphia, Pennsylvania.

Conventionally purified L-Asparaginase is known to be somewhat unstable when stored for even relatively short periods of time. Natural processes of degradation occur which will reduce the effectiveness and purity of the enzyme. According to one embodiment of this invention, it has been found that certain agents will stabilize the L-Asparaginase and prevent this natural degradation. These agents comprise mercapto ethanol, dextrose, vitamin C and amino acids such as glycine, cysteine and alanine. These stabilization agents are admixed with the protein at various stages in the purification process, especially in the stages of the purification process wherein the protein is present in relatively dilute solutions and free of contaminating proteins. It is generally preferred to admix the stabilization agent with the L-Asparaginase buffer solution entering the chromatographic column, or with the solution eluted from the chromatographic column. The amount of the stabilization agent added is generally not critical and, for example, can range from 50 to 500 milligrams per 200,000 I.U. of L-Asparaginase. For example, the addition of one-half milliliters of dextrose per 100 milliliters of buffer containing L-Asparaginase supplied to the chromatographic column is sufficient.

A better understanding of the invention can be obtained by referring to the following example showing the various embodiments of this invention, but which is not intended, however, to be unduly limitive of the invention.

EXAMPLE

A nutrient medium for growth of a microbial organism was prepared by diluting 20 parts by volume of a corn steep liquor, specifically Corn Steepwater (Corn Products Co., New York, N.Y.) to 60 parts by volume with deionized water which was adjusted to pH 7.0 to 7.5 with potassium hydroxide. A heavy precipitate which formed during the adjustment of the pH of the Corn Steepwater solution was removed by filtration and the filtrate after being heated to the boiling point was again filtered. The resulting filtrate was then diluted to 400 parts by volume with deionized water and steam sterilized. E. coli (obtained from the Wadley Research Institute, Dallas, Texas and identified as their HAP strain) was grown aerobically for 12 to 18 hours at 37° C. in the above nutrient medium.

The E. coli cells were harvested by centrifugation at 5° C. and resuspended in 0.02 M potassium phosphate buffer, pH 8. The buffer solution was also maintained at 5° C., and a sufficient quantity of the buffer was used to produce a solution containing between 8 and 10 percent (dry weight) cell suspension. The cell suspension was ruptured by sonication.

Next, 0.50 volume absolute ethanol was added slowly to the ruptured cell solution while stirring, and the resultant alcohol-cell suspension mixture was stirred for 30 minutes and allowed to stand for an additional hour.

A precipitate of cell walls and other undesirable components, which formed after addition of the ethanol, was removed by centrifugation. 0.75 volume of absolute ethanol was added to the supernatant resulting in the precipitation of L-Asparaginase and other proteins. The precipitate contained 17.1 million I.U. of L-Asparaginase. The above enzyme containing precipitate (a semisolid very viscous material) was mixed with 850 milliliters of 0.05 M sodium acetate buffer, pH 5.5, and stirred with a magnetic stirrer constantly at 500 r.p.m. for 2 hours in a cold room maintained at 40° F. to achieve complete suspension of the material.

Next, the buffer suspension was centrifuged at 10,000 r.p.m. for 1½ hours while still in the cold room maintained at 40° F. The resulting supernatant was tested for enzyme and total protein and saved for further reprocessing. The supernatant contained a volume of 700 milliliters with a protein content of 36 milligrams per milliliter, and 6,700 I.U. of L-Asparaginase per milliliter (specific activity = 186 I.U. L-Asparaginase/milligram protein).

The L-Asparaginase containing precipitate from the above described buffer extraction step was suspended in 1.4 liters of 0.05 M sodium acetate buffer (pH 5.5) and stirred (at 500 r.p.m.) for 2 hours in a cold room maintained at 40° F. This buffer solution was again centrifuged at 10,000 r.p.m. for 1 hour, and a small amount of the suspended material was spun down and discarded. The resulting supernatant contained a total of 8,700 I.U. L-Asparaginase per milliliter and a volume of 1.5 liters (a total L-Asparaginase content of 10.5 million I.U.) The specific activity was 241 I.U. per milligram protein.

Next, the buffer suspension containing the L-Asparaginase was placed on a specially prepared chromatographic column. The composition of this column was made up of a mixture of carboxymethyl Sephadex (CM Sephadex C–50) and a water insoluble nonionic cellulose powder (Solk1 Floc BX–200) approximately 250 grams of CM Sephadex and 150 grams of Solka Floc BW–200 were admixed to form a 200 liter admixture which was used to pack a column of plastic tubing 0.5 feet in diameter and 3.5 feet long. The column was initially equilibrated by passing about 10 liters of 0.05 M sodium acetate buffer, pH 5.5, therethrough. This was checked by measuring the effluent pH until it equaled the pH of the buffer entering the column (pH 5.5). It is noted that a column of Sephadex of this size can be used for up to about 20 million International Units (I.U.) of L-Asparaginase. The amount of the water insoluble nonionic sorbent material relates essentially to the endotoxin in the solution being treated. This endotoxin content can vary according to the strain of bacteria used, and the nature of the initial crude purification methods employed. Thus, after the L-Asparaginase-buffer solution was charged to the above described specially prepared chromatographic column, an elution gradient was effected to separate the L-Asparaginase by the above column as follows: a first chamber was provided which operatively communicated to a second chamber. The first chamber contained 0.05 M sodium acetate buffer plus 0.5 N sodium chloride, pH 5.5, and the second chamber contained 0.05 M sodium acetate buffer, pH 5.5. The resulting elutant was applied to the column and the enzyme began eluting from the column at a salt concentration of about 0.3 N sodium chloride.

The L-Asparaginase containing eluate is treated with an equal volume of absolute ethanol to thereby precipitate the L-Asparaginase. The L-Asparaginase precipitate was taken up in a phosphate buffer pH 7.0 (0.01 M) to yield 20,000 I.U. of L-Asparaginase per milliliter.

At this point one-half mililiter of dextrose was added to each 100 milliliters of L-Asparaginase buffer solution. The resulting solution was centrifugated at 10,000 r.p.m. for 30 minutes and then filtered through a filter means (0.2-micron pore size). A test of this material indicated that it was substantially free of endotoxin and pyrogen (the test being sensitive to $10^{-12}$ gram).

The final product can be stored as liquid under refrigeration for normal use. The product can be stored for longer periods if it is frozen or desiccated from the frozen state. For use, the desiccated material is redissolved in normal saline, 5 percent dextrose, or 5 percent dextrose in normal saline.

The above example was given to illustrate the various embodiments of this invention. It is to be noted that various of the other alternative procedures described in the specification can be used to yield a very pure L-Asparaginase product, substantially free of endotoxin and pyrogen. Thus, the particular reactants can be modified as described above and the order of conducting the particular steps, e.g., the buffer-extraction, chromatographic separation, stabilization, and/or noxious agent removal step can be varied as desired.

What is claimed is:

1. A method of purifying L-Asparaginase from a mixture containing a ruptured microbial organism which yields L-Asparaginase comprising:
   a. separating a protein mixture containing L-Asparaginase from said ruptured microbial organism;
   b. adding to said protein mixture a buffer solution maintained at a pH in the range of 5.3 to 5.7 in sufficient quantities to yield a buffer-protein mixture containing from 40 to 400 milligrams protein per milliliter of buffer;
   c. thoroughly admixing the resulting protein-buffer mixture causing said protein to solubilize and form a resulting solution containing L-Asparaginase suspended therein; and
   d. separating said L-Asparaginase from said resulting solution.

2. The method of claim 1 further comprising removing noxious components from the protein mixture by intimately contacting the protein mixture with a water insoluble, nonionic, sorbent material.

3. The method of claim 2 wherein said sorbent material is mixed with said protein mixture in an amount in the range of from 5 to 25 weight percent of the total protein mixture.

4. The method of claim 3 further comprising suspending the L-Asparaginase removed from said resulting solution in a buffer solution and chromatographically separating the L-Asparaginase from other constituents therein.

5. The method of claim 4 further comprising adding a minor effective proportion of a stabilization agent for said L-Asparaginase to the L-Asparaginase product from the chromatographic separation.

6. The method of claim 5 wherein said stabilization agent is selected from dextrose, vitamin C, mercapto ethanol and amino acids.

7. The method of claim 6 wherein said amino acids comprise glycine, cysteine and alanine.

8. The method of claim 1 wherein said protein mixture containing L-Asparaginase is separated from said ruptured microbial organism by precipitation with a water miscible organic solvent.

9. The method of claim 1 wherein said protein mixture contains from 0 to 40 weight percent of a water miscible organic solvent.

10. The method of claim 9 wherein said water miscible organic solvent comprises ethanol.

11. A method of purifying L-Asparaginase from a protein mixture containing L-Asparaginase and unwanted proteins comprising:
   a. adding to said protein mixture a buffer solution which will solubilize said unwanted proteins, but is relatively a nonsolvent for L-Asparaginase, said buffer solution being maintained at a pH in the range of 5.3 to 5.7 and is added to said protein mixture in an amount ranging from 2.5 to 25 milliliters per gram of total protein;
   b. thoroughly admixing the dispersion from step (a) causing said unwanted protein to solubilize and form a resulting solution containing L-Asparaginase suspended therein; and
   c. removing said L-Asparaginase from said resulting solution.

12. The method of claim 11 wherein said L-Asparaginase is removed from said resulting solution by centrifugation.

13. The method of claim 11 further comprising solubilizing the separated L-Asparaginase in a buffer solution and immediately contacting the resulting solution with a particulate, water insoluble, nonionic sorbent material selected from polysaccharides and polydextrose in an amount of from 5 to about 25 percent by weight of the total protein solids of said solution to thereby remove noxious components therefrom and thereafter separating said sorbent material from said buffer.

14. The method of claim 13 further comprising chromatographically separating the L-Asparaginase and said buffer solution from other constituents therein.

15. The method of claim 14 wherein said chromatographic separation is accomplished in a chromatographic column containing cation exchange resin.

16. The method of claim 13 further comprising admixing a minor portion of a stabilization agent for the L-Asparaginase to the L-Asparaginase from said chromatographic column.

17. The method of claim 16 wherein the stabilization agent is selected from dextrose, vitamin C, mercaptan ethanol and amino acids.

* * * * *